United States Patent
Mikkelsen, Jr.

[11] Patent Number: 6,054,071
[45] Date of Patent: Apr. 25, 2000

[54] POLED ELECTRETS FOR GYRICON-BASED ELECTRIC-PAPER DISPLAYS

[75] Inventor: James C. Mikkelsen, Jr., Los Altos, Calif.

[73] Assignee: Xerox Corporation, Stamford, Conn.

[21] Appl. No.: 09/014,647

[22] Filed: Jan. 28, 1998

[51] Int. Cl.[7] .............................. B29B 13/08; B29D 11/00
[52] U.S. Cl. ...................... 264/1.36; 264/1.7; 264/8; 264/436; 264/437; 264/108
[58] Field of Search .............. 264/1.7, 436, 437, 264/1.36, 2.6, 2.7, 108, 343, 8, 13, 4, 7; 359/296; 425/8

[56] References Cited

U.S. PATENT DOCUMENTS

| | | | |
|---|---|---|---|
| 3,586,743 | 6/1971 | Van Eeck | 264/436 |
| 4,126,854 | 11/1978 | Sheridon | |
| 4,143,103 | 3/1979 | Sheridon | |
| 4,623,438 | 11/1986 | Felton et al. | 204/168 |
| 4,944,854 | 7/1990 | Felton et al. | 204/168 |
| 5,246,637 | 9/1993 | Matsuura et al. | |
| 5,262,098 | 11/1993 | Crowley et al. | 264/8 |
| 5,344,594 | 9/1994 | Sheridon | 264/4.1 |
| 5,604,027 | 2/1997 | Sheridon | 428/323 |
| 5,656,205 | 8/1997 | Rabolt et al. | |

FOREIGN PATENT DOCUMENTS

| | | | |
|---|---|---|---|
| 51-132948 | 5/1978 | Japan | |
| WO 88/00132 | 1/1988 | WIPO | 264/436 |

*Primary Examiner*—Mathieu D. Vargot
*Attorney, Agent, or Firm*—Fay, Sharpe, Fagan Minnich & McKee, LLP

[57] ABSTRACT

Twisting balls (10) for an electric-paper display are formed from a polarizable material and encapsulated in a protective shell (12). The balls (10) are disposed between first and second electrodes (14, 16) which generate an electric field. The electric field polarizes each ball (10) transforming each into a dipole electret having a first and second charged poles. At least one colorant (20) is applied to each of the balls (10) to obtain multichromal balls such that the charged poles are distinct from each other. The polarized multichromal balls may then be used in fabricating an electric-paper display by encapsulating the balls (10) in an array such that each ball is capable of rotating in response to a selectively applied electric field.

18 Claims, 2 Drawing Sheets

POLED ELECTRETS FOR GYRICON-BASED ELECTRIC-PAPER DISPLAYS

BACKGROUND

The present invention relates to the art of twisting ball electric-paper displays. It finds particular application in conjunction with fabrication of polarized small balls for use in an electric-paper display sheet.

An electric paper display device, also known as gyricon-based electric paper display, is typically in sheet form as described in U.S. Pat. Nos. 4,126,854 and 4,143,103 assigned to the present assignee and which are fully incorporated herein by reference. The electric paper display comprises a thin transparent sheet having many of the attributes of paper documents. It looks like paper, has ambient light valve behavior like paper (i.e. the brighter the ambient light, the more easily it may be seen), flexible like paper, can be carried around like paper, can be written on like paper, can be copied like paper, and has nearly the archival memory paper. It is also possible to form the display device as a rigid structure incorporating an array of addressing electrodes. In both embodiments, the salient features are an elastomeric host layer a few mils thick which is heavily loaded with bichromal balls tens of microns in diameter. Each bichromal ball has hemispheres of contrasting colors, such as a white half and a black half, and is contained in its own spherical cavity filled with a dielectric liquid. Upon application of an electrical field between electrodes located on opposite surfaces of the host layer, the balls will rotate according to the interaction of their dipole and depending on the polarity of the electric field generated, presenting one or the other hemisphere to an observer.

In a previous method for fabricating bichromal balls as shown in U.S. Pat. No. 5,344,594 assigned to the present assignee, monochromatic glass balls are formed and heavily loaded with titanium dioxide so as to appear white. The balls are deposited in a monolayer upon a substrate. Then the surface of each ball is coated from one direction in a vacuum evaporation chamber with a dense layer of nonconductive black material which coats one hemisphere. The bichromal balls are mounted in liquid filled cavities and suspended in a host matrix. Both the liquid surrounding the balls and the balls themselves are dielectric. Therefore, although the balls are macroscopically electrically neutral, on a microscopic scale they have an electrical double layer comprising two layers of charges of opposite sign. One charge layer is localized at the surface of the ball and the other charge layer is in the nature of a space charge extending outward from the surface of the ball into the dielectric liquid.

A measurable aspect of the electrical double layer, known as the zeta potential, is the net surface and volume charge that lies within a shear surface associated with the motion of the ball through the dielectric liquid. For a given liquid, the zeta potential is a function only of the ball surface material. Thus, the material properties which give rise to differences associated with the color or reflectivity of each hemisphere of a ball gives rise to different characteristic zeta potentials with respect to the dielectric liquid in the cavity containing a ball. It is the difference in zeta potential between the hemispheres of the ball which causes the ball to act like a dipole in the presence of an electrical field generated by oppositely disposed electrodes. In other words, each ball will rotate until its dipole moment lines up with the direction of the electrical field established between the opposed electrodes.

In addition to the dipole charge distribution found on the bichromal ball in the presence of an electrical field, there is also a monopole charge with the net electrical charge. It is quite unlikely that the two hemispheres of a ball having zeta potentials of opposite polarity will have the same magnitude. However, if that is the case, a monopole charge will not be established. As a result of the monopole charge, a ball is caused to translate in the direction of the electrical field and will rest and be retained against the cavity wall. In order for the ball to rotate easily in the liquid within the cavity, due to the dipole charge, it must move from contact with the cavity wall. When at rest against the cavity wall, friction and other forces will prevent it from rotating until it has been moved away once again, due to the monopole charge. It is this feature which enables long term image retention in this display device.

Other methods of fabricating bichromal balls are described in U.S. Pat. Nos. 5,262,098 and 5,344,594 assigned to the present assignee. In the '098 patent, a spinning disc method is described. In the '594 patent, balls are formed by the flowing together of two side-by-side streams of differently colored hardenable liquids into the center of a laminarly flowing host liquid. As the bichromal stream is transported by the host liquid as a free jet, its forward end becomes unstable and breaks up into droplets which form into spherical balls as they are moved by the host liquid. Further transport of the balls by the host liquid moves them past a curing station and a separating station.

The prior art methods of fabricating bichromal balls for an electric paper display involve a chemical process which adds a chemical charge to the surface of each ball by applying differently charged dyes or pigments to the ball hemispheres. The hemispherically-differential surface chemistry, thus, creates a dipolar ball which will align in an external electric field. Each half of a ball is made with differentiating pigment and/or constituent materials, which charge to different degrees in the fluid in which the balls rotate. Alternately, a hemispherical coating is applied to one hemisphere of a monochromal ball to differentiate its surface charge characteristics from the uncoated hemisphere. The chemical surface charging of bichromal balls suffers from being susceptible to neutralization by triboelectricity or the presence of impurity ions adjacent to and/or mixed within the charged surface coating.

The present invention contemplates a new and improved method of fabricating twisting balls for electric-paper displays which overcomes the above-referenced problems and others.

SUMMARY OF THE INVENTION

A new and improved method of forming multichromal balls for an electric paper display is provided. A plurality of balls are formed from a core material and each ball is encapsulated in a shell. The core material of each of the plurality of balls are transformed into a dipole electret having a first charged pole and a second charged pole where the first charged pole is different from the second charged pole. Each of the plurality of balls are colored forming multichromal balls such that the first charged pole of each ball is distinct from the second charged pole.

In accordance with a more limited aspect of the present invention, the plurality of balls are adhered to a substrate and heated to a fluid state. Two electrodes are provided for generating an electric field therebetween. The substrate and the plurality of balls are positioned between the two electrodes and the plurality of balls are polarized by the electric field. The plurality of balls are then cooled to a solid state in the presence of the electric field.

In accordance with another aspect of the present invention, a method of forming an electric paper video display is provided. Once the multichromal balls are formed with a first charged pole and a second charged pole, the video display is fabricated by encapsulating the multichromal balls in an array such that each multichromal ball is capable of rotating to display a colorant in response to an electric field selectively applied thereto.

One advantage of the present invention is that by polarizing the core of each ball, a more stable dipole is created than with chemically charged balls.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
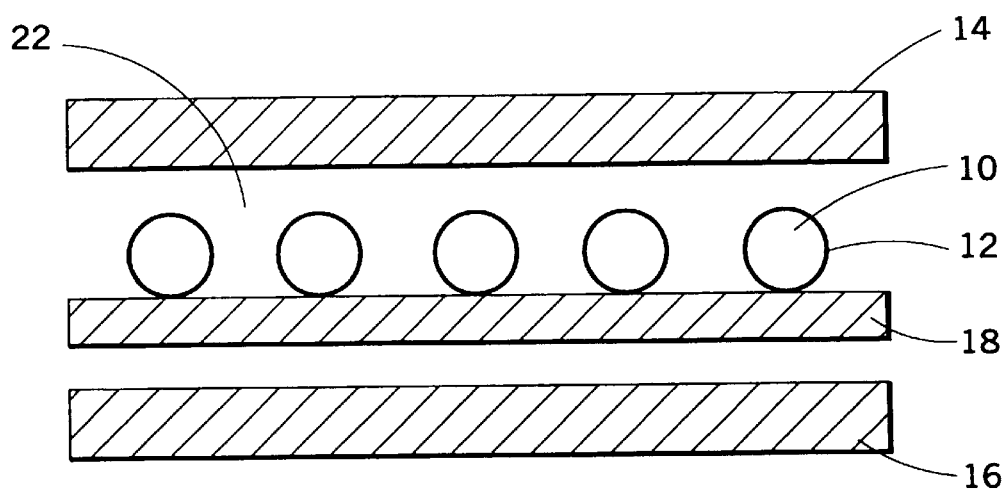
FIG. 1 is an illustration is a plurality of twisting balls being polarized between two electrodes in accordance with the present invention.

With reference to FIG. 1, small balls 10, typically 0.05 to 0.5 millimeters in diameter, are formed by any process which atomizes a selected fluid into droplets as described, for example, in U.S. Patent No. 5,262,098 assigned to the present assignee. The balls 10 are formed as monochromal balls which are subsequently colored or, alternately, are formed as bichromal balls during the forming process. A polarizable material is used to form a core of the balls such as a polymer or wax. In the preferred embodiment, a polyethylene based wax material is used.

Once a set of balls 10 are formed, each ball is encapsulated in a protective cover or shell 12 to maintain its generally circular shape. The shell material is selected such that it can be applied as a thin coating around each ball 10. Alternately, the shell is formed as a sheet which continuously and collectively encloses a plurality of balls 10. Furthermore, as will be described below, each ball will be heated to a molten state, and since waxes and polymers expand when heated, the shell material further serves to contain the melted core of wax or polymer. Typically, wax expands greater than 10% when melted creating a significant stress on the shell coating 12. Therefore, the shell material is selected such that it is thick enough to avoid pinholes, but thin enough to remain elastic. Using a less-crystalline wax material as the ball core would reduce the melt-expansion characteristics of each ball and thereby reduce the possibility of shell rupture.

In order to function as a twisting ball in an electric paper display, portions of each ball are charged such that each ball reacts (eg. aligns) in the presence of an electric field. To obtain the desired charged properties, each encapsulated ball 10 is polarized to transform each ball 10 into a dipole electret. This is obtained by disposing the encapsulated balls 10 between two electrodes, namely, a top electrode 14 which is positive and a bottom electrode 16. The electrodes 14 and 16 generate an electric field between each other. Since the conductivity of wax or polymer media used to form the core of each ball is significantly higher in a molten state than when in a solid state, the balls 10 are heated as the electrodes generate a sufficiently high electric field. The molten state of the core causes ions of the core material to become mobile and the electric field causes the mobile ions to migrate or drift toward an oppositely charged electrode. Each ball is, thus, transformed into a dipole having a substantially positive hemisphere and a negative hemisphere. Alternately, in a non-net neutral ball or net monopole ball, each ball may have a similar charge on both hemispheres except that one hemisphere may have a sufficiently higher charge than the other hemisphere thereby distinguishing the two hemispheres.

After the balls 10 are exposed to the electric field for a selected time period to achieve a desired polarization, the core of the balls are cooled to a solid state. In the solid state, the rate of decay of the polarization of each ball is significantly decreased such that each ball maintains its dipole properties for long periods of time, even after the electric field is removed.

Figure 2:
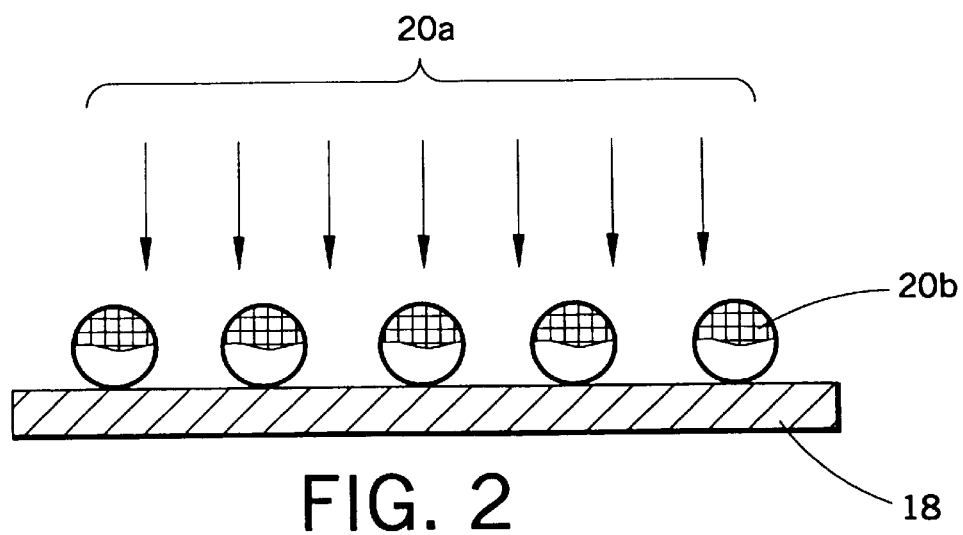
FIG. 2 is an illustration of the plurality of balls having a colorant applied thereto.

With reference to FIG. 2, once the balls 10 are polarized into dipoles, they are aligned with hemispherical colorant, that is, the pole and coloration are correlated. In one embodiment, an array of balls 10 are fixed to a substrate 18 and polarized the between two electrodes 14 and 16 as described above. The substrate 18 and polarized balls are then transferred to a coloring device for deposition of a colorant 20a to the "top" of the polarized balls 10. For example, if the top of the balls 10 are poled negative and a black colorant 20b is applied to the top of each ball, bichromal balls are produced which are bipolar having black side negative.

Alternately, during the polarization step, the substrate 18 and attached balls 10 are surrounded by an insulating medium 22 such as a dielectric fluid to prevent air breakdown. Air breakdown occurs when a high electric field generated by the two electrodes 14 and 16 ionizes the airfield therebetween to a point where arcing occurs. Arcing is undesirable because it can damage the balls and/or the electrodes and introduce uncontrolled ion charge.

Figure 3:
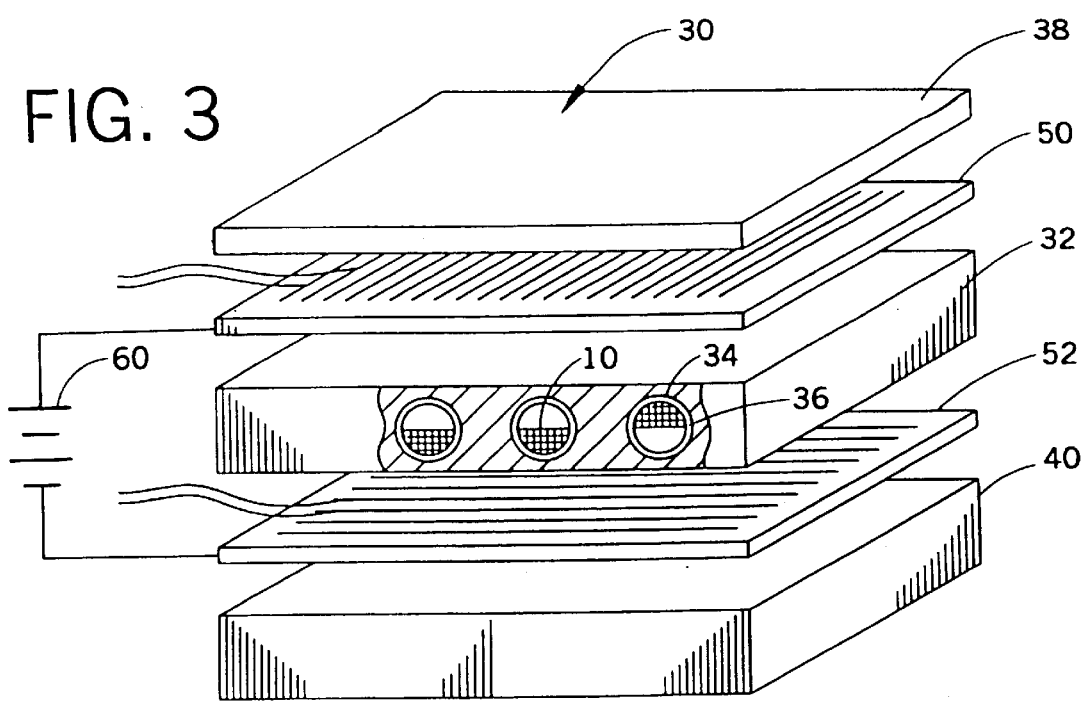
FIG. 3 is a perspective view of an electric paper display formed with the balls of the present invention.

With reference to FIG. 3, an electric paper display sheet 30 (not to scale) is fabricated by encapsulating an array of the bipolar bichromal balls 10 in a panel 32 made from an elastomer or other suitable material such that each ball is capable of rotating in response to a selectively applied electric field but without having translational movement. The panel 32 is provided with cavities 34 which each contain one ball and have a diameter slightly larger than a diameter of the contained ball 10. Alternately, in less confined cavities or grids having one or more balls per cavity, translational movement may be possible. An optically transparent fluid 36 fills each cavity 34 such that each ball 10 is allowed rotational movement. The panel 32 is disposed between substrates 38 and 40. A first grid of electrical conductors 50 is disposed between the substrate 38 and the panel 32 which a second grid of electrical conductors 52 is disposed between the substrate 40 and the panel 32. The second grid of electrical conductors is preferably disposed at an angle to the first grid 50, for example, orthogonal. A power source 60 is coupled across the electrical conductors to generate an electric field in selected regions of the panel 32 which causes one or more balls 10 in that region to rotate in accordance to its charged dipole. The display sheet 30 includes optically transparent material such that the encapsulated balls 10 are visible to an observer.

Figure 4:
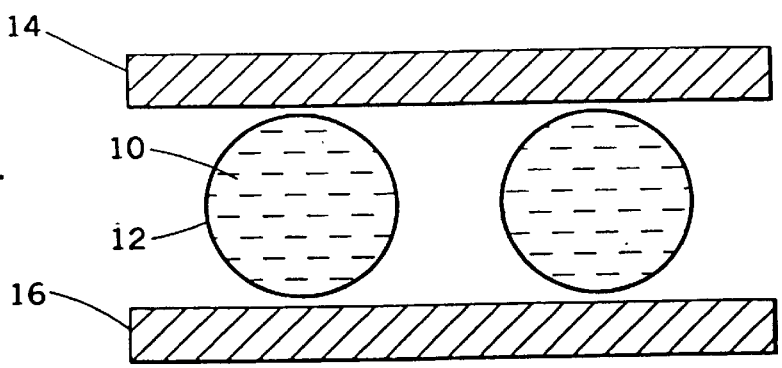
FIG. 4 is an illustration of an alternative embodiment of the present invention showing an initial position of monochromal balls in an electric field.
Figure 5:
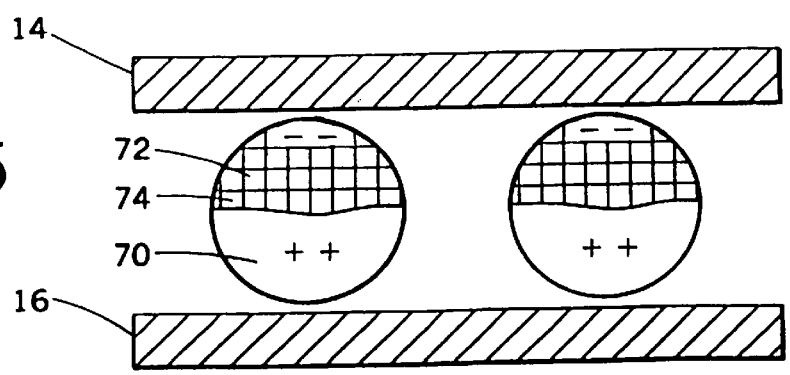
FIG. 5 illustrates the balls of FIG. 4 being poled and hemispherically colored in accordance with the present invention.

With reference to FIGS. 4 and 5, an alternate process for aligning the colorant with the dipole of a ball is to electrophoretically move the colorant or pigment with the mobile charge of the core material. The balls 10 are initially gray or some other mixture of white and a colorant. For example, one colorant is a neutral dye and the other an electrophoretically-charged pigment. As an electric field is applied to the balls 10 during the polarization process, the ions within the core material begin to migrate to the attracting electrode. Since the applied pigment is also charged, it also migrates to one hemisphere as shown in FIG. 5, where a white pigment 70 is positively charged and thus, migrates to the opposite hemisphere away from the positive top electrode 14. This results in a dipole bichromal ball having a negative counterion at a top pole 72 which is colored with a black dye 74.

Another alternative process for aligning the colorant with the dipole is to use a metastable pigment dispersion which will "settle" in combination with an immobile dye and mobile ions. After a pigmented dye is applied, it settles to form one colored hemisphere as shown in FIG. 5, and an electric field subsequently creates a dipole of the mobile charge. The dye, however, remains dispersed to color the opposite hemisphere. Thus, one side of each ball 10 is pigmented by settling or centrifugation and an electric field produces a dipole without disturbing the pigment. The steps in this process include fabrication of mixed-chromal balls (e.g., immobile dye and pigment, and mobile ions) by spinning disk or other device, encapsulating each ball with a suitable shell material, disposing each ball layer between electrodes with an optional dielectric fluid to prevent air breakdown, heating the ball assembly above the melting point of the ball core material, centrifuging to settle the pigment, applying a DC electric field for a sufficient time to plate pigment on one side of each ball, cooling the ball assembly to freeze each core material and recovering the balls. Lastly, an electric paper sheet is fabricated by encapsulating an array of balls in an elastomer or other suitable material as explained above.

For exemplary purposes, the following is a description of a fabrication process. Polyethylene-oxide-doped polywax balls, with white pigment, are coated with about 4 micrometers of parylene and encapsulated in sylgard elastomer sheets. The sheets were spun for about 30 minutes in a centrifuge and heated above the melting point of the wax, and then cooled. At this point, the balls are hemispherically white and clear. The sheets are then reheated between two electrodes with approximately 200 V applied voltage for about 30 minutes, and then cooled. These steps may be performed simultaneously by disposing an electrode within the centrifuge to polarize the balls during the centrifuging. The elastomer sheets are swelled in isopar and observed in an alternating electric field. The balls were observed to switch with the alternating field, namely, the white pigmented side of the balls were positive, in agreement with the expected dipole produced in the polling field.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A method of forming an electric paper display comprising the steps of:

forming monochromal balls from a polarizable material;

encapsulating each of the monochromal balls in a shell;

polarizing the monochromal balls by applying a first electric field thereto such that each ball forms a positive hemisphere and a negative hemisphere;

applying at least one colorant to each of the monochromal balls to obtain multichromal balls such that the positive hemispheres of each ball carry a colorant distinct from the negative hemispheres; and fabricating an electric paper display by encapsulating the multichromal balls in an array such that each multichromal ball is capable of rotating to display a colorant in response to a second electric field selectively applied thereto.

2. The method as set forth in claim 1 further including:

before the polarizing step, heating the monochromal balls such that the polarizable material attains a state of increased conductivity; and after the polarizing step, cooling the monochromal balls such that the polarizable material attains a state of low conductivity.

3. The method as set forth in claim 1 wherein the polarizing includes:

providing two electrodes for generating an electric field therebetween; and positioning the monochromal balls between the two electrodes and exposing the monochromal balls to the electric field for a sufficient time to polarize each of the monochromal balls.

4. The method as set forth in claim 3 further includes surrounding the monochromal balls in a dielectric fluid to prevent arcing.

5. The method as set forth in claim 1 wherein the applying at least one colorant includes applying a charged pigment to each ball such that the charged pigment migrates to one area of each ball in accordance with the first electric field.

6. The method as set forth in claim 1 wherein the fabricating includes providing a panel having an array of cavities, each of the cavities containing one multichromal ball such that the one multichromal ball is capable of rotating therein.

7. The method as set forth in claim 1 wherein the shell is formed as a sheet which collectively encapsulates a plurality of the monochromal balls.

8. A method of forming multichromal balls for an electric paper display comprising the steps of:

forming a plurality of balls from a core material;

encapsulating each of the plurality of balls in a shell;

transforming the core material of each of the plurality of balls into a dipole electret having a first charged pole and a second charged pole, the first charged pole being differently charged than the second charged pole; and forming multichromal balls by coloring each of the plurality of balls such that the first charged pole of each ball is distinct from the second charged pole.

9. The method as set forth in claim 8 further including, after the encapsulating step:

adhering the plurality of balls to a substrate;

heating the plurality of balls to a fluid state;

providing two electrodes for generating an electric field therebetween;

positioning the substrate and the plurality of balls between the two electrodes, the plurality of balls being polarized by the electric field; and cooling the plurality of balls to a solid state.

10. The method as set forth in claim 8 wherein the forming of the plurality of balls includes atomizing a fluid into droplets.

11. The method as set forth in claim 8 wherein the forming multichromal balls includes applying a charged pigment to each of the plurality of balls such that during the transforming, the charged pigment migrates to one of the first and second charged poles.

12. The method as set forth in claim 8 wherein the forming multichromal balls includes applying a colorant to each of the plurality of balls and aligning the colorant to one of the first and second charged poles of each of the plurality of balls.

13. The method as set forth in claim 8 wherein the shell is formed as a sheet for collectively encapsulating the plurality of balls.

14. A method of forming multichromal balls comprising the steps of:

forming a plurality of balls from a polarizable material;

coating the plurality of balls with a protective cover;

polarizing the polarizable material of each of the plurality of balls forming a first charged pole and a second charged pole, the first charged pole being differently charged than the second charged pole; and forming multichromal balls by coloring each of the plurality of balls such that the first charged pole of each ball is optically distinct from the second charged pole.

15. The method as set forth in claim 14 wherein the polarizing includes applying an electric field to the plurality of balls for a selected duration.

16. The method as set forth in claim 14 wherein the polarizing includes:

heating the plurality of balls until the polarizable material attains a conductive state, the protective cover containing the conductive state of the polarizable material; and after the first and second charged poles are formed, cooling the plurality of balls until the polarizable material attains a non-conductive state.

17. The method as set forth in claim 16 wherein the conductive state is a fluid state, and the non-conductive state is a solid state.

18. The method as set forth in claim 14 wherein the polarizing includes transforming each of the plurality of balls into a dipole electret.

* * * * *